(12) United States Patent
Cambon et al.

(10) Patent No.: US 9,303,148 B2
(45) Date of Patent: *Apr. 5, 2016

(54) RUBBER COMPOSITION DEVOID OF OR PRACTICALLY DEVOID OF ZINC

(75) Inventors: Stéphanie Cambon, Chamalieres (FR); Didier Vasseur, Clermont-Ferrand (FR)

(73) Assignees: COMPAGNIE GENERALE DES ETABLISSEMENTS, Clermont-Ferrand (FR); MICHELIN RECHERCHE ET TECHNIQUE S.A., Granges-Paccot (CH)

( * ) Notice: Subject to any disclaimer, the term of this patent is extended or adjusted under 35 U.S.C. 154(b) by 302 days.

This patent is subject to a terminal disclaimer.

(21) Appl. No.: 11/658,676

(22) PCT Filed: Jul. 28, 2005

(86) PCT No.: PCT/EP2005/008181
§ 371 (c)(1),
(2), (4) Date: Jan. 29, 2007

(87) PCT Pub. No.: WO2006/013056
PCT Pub. Date: Feb. 9, 2006

(65) Prior Publication Data
US 2009/0131572 A1    May 21, 2009

(30) Foreign Application Priority Data

Jul. 29, 2004 (FR) .................................. 04 08425
Dec. 3, 2004 (FR) .................................. 04 12837

(51) Int. Cl.
C08K 3/04 (2006.01)
C08K 5/548 (2006.01)
B60C 1/00 (2006.01)

(52) U.S. Cl.
CPC ............. *C08K 5/548* (2013.01); *B60C 1/0016* (2013.04); *Y02T 10/862* (2013.01)

(58) Field of Classification Search
CPC ........ C08K 5/548; C08L 21/00; B60C 1/0016
See application file for complete search history.

(56) References Cited

U.S. PATENT DOCUMENTS

| | | | | |
|---|---|---|---|---|
| 3,451,458 A * | 6/1969 | Stueber | | 152/209.1 |
| 5,126,501 A * | 6/1992 | Ellul | | 524/394 |
| 5,650,457 A | 7/1997 | Scholl et al. | | |
| 6,028,144 A * | 2/2000 | Nguyen et al. | | 525/236 |
| 6,506,827 B2 * | 1/2003 | Nakano | | 524/433 |
| 7,629,408 B2 * | 12/2009 | Cambon et al. | | 524/492 |
| 2001/0056138 A1 * | 12/2001 | Vasseur | | 524/91 |
| 2002/0140288 A1 * | 10/2002 | Herberger et al. | | 305/165 |
| 2004/0051210 A1 * | 3/2004 | Tardivat et al. | | 264/349 |
| 2004/0116587 A1 * | 6/2004 | Victor Thielen et al. | | 524/493 |
| 2004/0129360 A1 | 7/2004 | Vidal | | |
| 2004/0132880 A1 * | 7/2004 | Durel et al. | | 524/262 |
| 2005/0016650 A1 | 1/2005 | Durel et al. | | |
| 2005/0016651 A1 * | 1/2005 | Durel et al. | | 152/209.1 |
| 2005/0155687 A1 * | 7/2005 | Amaddeo et al. | | 152/539 |
| 2005/0197442 A1 * | 9/2005 | Jones et al. | | 524/474 |
| 2005/0228107 A1 * | 10/2005 | Lin et al. | | 524/492 |
| 2006/0086450 A1 * | 4/2006 | Hogan et al. | | 156/110.1 |
| 2007/0299197 A1 * | 12/2007 | Lin et al. | | 524/543 |
| 2008/0041508 A1 * | 2/2008 | Cambon et al. | | 152/209.15 |
| 2009/0131572 A1 * | 5/2009 | Cambon et al. | | 524/437 |
| 2010/0317795 A1 * | 12/2010 | Araujo Da Silva et al. | | 524/575.5 |
| 2011/0028598 A1 * | 2/2011 | Veyland et al. | | 523/157 |

FOREIGN PATENT DOCUMENTS

| | | |
|---|---|---|
| EP | 0680997 A | 11/1995 |
| FR | 2823215 A | 10/2002 |
| WO | WO 03/002649 A | 1/2003 |
| WO | WO 03/054081 * | 7/2003 |

OTHER PUBLICATIONS

Scifinder CAS# 40372-72-3 Data sheet (Si69/Silane 69 data sheet). No Author, No Date. Obtained online May 22, 2012.*

* cited by examiner

*Primary Examiner* — Michael A Salvitti
(74) *Attorney, Agent, or Firm* — Dickinson Wright PLLC

(57) ABSTRACT

The invention relates to a rubber composition devoid of or practically devoid of zinc or zinc derivative, usable in particular for the manufacture of tires or tire treads, comprising at least:
  a diene elastomer;
  an inorganic filler as reinforcing filler;
  optionally carbon black, in an amount less than 5 phr;
  a silane polysulfide of formula (I):

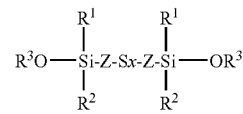

in which:
  the symbols $R^1$ and $R^2$, which may be identical or different, each represent a monovalent hydrocarbon group selected from among alkyls, whether straight-chain or branched, having from 1 to 6 carbon atoms and the phenyl radical;
  the symbols $R^3$, which may be identical or different, each represent hydrogen or a monovalent hydrocarbon group selected from among alkyls, whether straight-chain or branched, having from 1 to 4 carbon atoms and alkoxy-alkyls, whether straight-chain or branched, having from 2 to 8 carbon atoms;
  the symbols Z, which may be identical or different, are divalent bond groups comprising from 1 to 18 carbon atoms;
  x is an integer or fractional number equal to or greater than 2.

42 Claims, No Drawings

RUBBER COMPOSITION DEVOID OF OR PRACTICALLY DEVOID OF ZINC

The present invention relates to diene rubber compositions reinforced with an inorganic filler such as silica, which can be used in particular for the manufacture of tires or semi-finished products for tires, such as treads.

Vulcanization of diene elastomers by sulfur is widely used in the rubber industry, in particular in the tire industry. A relatively complex vulcanization system comprising, in addition to the sulfur, various vulcanization accelerators and also one or more vulcanization activators, very particularly zinc derivatives such as zinc oxide (ZnO), fatty acid zinc salts such as zinc stearate, is used to vulcanize the diene elastomers.

One medium-term object of tire manufacturers is to eliminate zinc or its derivatives from their rubber formulations, owing to the known environmental impact of these compounds, in particular with respect to water and aquatic organisms (classified R50 according to European Directive 67/548/CE of 9 Dec. 1996).

However, it happens that eliminating the zinc oxide, specifically from rubber compositions reinforced with an inorganic filler such as silica, has a very adverse effect on the processing characteristics (or "processability") of the rubber compositions in the uncured state, with a reduction in the scorching time which is crippling from the industrial point of view. It will be recalled that what is called the "scorching" phenomenon rapidly results, during the preparation of the rubber compositions in an internal mixer, in premature vulcanization, in very high viscosities in the uncured state, and ultimately in rubber compositions which are virtually impossible to work and to process industrially.

In a response to the problem of eliminating the zinc, it has admittedly been proposed to replace the zinc oxide by another metal oxide, for example MgO, or alternatively by a salt or oxide of a transition metal belonging to the groups IIA, IVA, VA, VIA, VIIA or VIIIA of the periodic table of the elements, particularly cobalt or nickel (see patent specifications U.S. Pat. No. 6,506,827 and WO 2003/054081).

Such solutions, apart from the fact that they do not meet the demands on rubber compositions reinforced with an inorganic filler, at least for some of them, are not really acceptable long-term, from the point of view of the protection of the environment, insofar as they propose replacing a metal with another metal, equally doomed in the end to be dispersed in the environment with the wear debris of the tires, particularly that of the treads inevitably resulting from the various types of friction due mainly to the braking, acceleration and cornering forces.

Now, the Applicants have found a novel solution which makes it possible to eliminate zinc totally from (or use it in a negligible quantity in) the rubber formulations reinforced with an inorganic filler such as silica, without replacing the zinc with another metal and while preserving the rubber compositions from the problem of premature scorching during their industrial processing.

Consequently, a first subject of the invention relates to a rubber composition, usable in particular for the manufacture of tires, said composition being characterized in that it is devoid of or contains less than 0.5 phr of zinc and comprises at least (phr=parts by weight per hundred parts of elastomer):

a diene elastomer;
an inorganic filler as reinforcing filler;
optionally carbon black, in an amount less than 5 phr;
a silane polysulfide of formula (I):

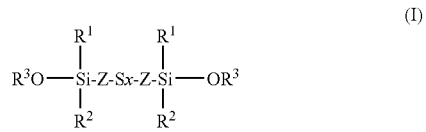

(I)

in which:
the symbols $R^1$ and $R^2$, whether identical or different, each represent a monovalent hydrocarbon group selected from among alkyls, which are straight-chain or branched, having from 1 to 6 carbon atoms and the phenyl radical;
the symbols $R^3$, which may be identical or different, each represent hydrogen or a monovalent hydrocarbon group selected from among alkyls, whether straight-chain or branched, having from 1 to 4 carbon atoms and alkoxyalkyls, whether straight-chain or branched, having from 2 to 8 carbon atoms;
the symbols Z, which may be identical or different, are divalent bond groups comprising from 1 to 18 carbon atoms;
x is an integer or fractional number equal to or greater than 2.

It is the combined use of the coupling agent of formula (I) and a very low or zero amount of carbon black which, unexpectedly, makes it possible completely to overcome the absence (or virtual absence) of zinc in the compositions of the invention.

The subject of the invention is also a process for preparing a rubber composition based on a diene elastomer and a reinforcing inorganic filler, devoid of or containing less than 0.5 phr of zinc and having improved processability in the uncured state, this process being characterized in that at least one inorganic filler as reinforcing filler, a silane polysulfide of formula (I) and from 0 to less than 5 phr of carbon black are incorporated by kneading in at least one diene elastomer.

Another subject of the invention is the use of a composition according to the invention for the manufacture of finished articles or semi-finished products, and also these finished articles and semi-finished products themselves, comprising a rubber composition according to the invention, these articles or semi-finished products being intended for all "ground contact systems" (or "suspension systems") for automobiles, such as tires, internal safety supports for tires, wheels, rubber springs, elastomeric joints and other suspension and antivibration elements.

A very particular subject of the invention is the use of a rubber composition according to the invention for the manufacture of tires or semi-finished rubber products intended for these tires, these semi-finished products being selected in particular from the group consisting of treads, underlayers intended for example to be positioned beneath these treads, crown plies, sidewalls, carcass plies, beads, protectors, inner tubes and airtight internal rubbers for tubeless tires.

The composition according to the invention is particularly suited to the manufacture of treads for tires intended to be fitted on passenger vehicles, vans, 4×4 vehicles (having 4 driving wheels), two-wheeled vehicles, "heavy vehicles" (that is to say subway trains, buses, road transport machinery (lorries, tractors, trailers), off-road vehicles), aircraft, or construction, agricultural or handling machinery.

Another subject of the invention is these ground contact systems for motor vehicles, these tires and semi-finished products made of rubber themselves, in particular treads, when they comprise a rubber composition according to the invention. The subject of the invention is in particular the use of such treads for the manufacture of new tires or the retreading of worn tires.

The invention also relates to these ground contact systems for motor vehicles, tires and treads both in the uncured state (i.e. before curing) and in the cured state (i.e. after crosslinking or vulcanization).

The invention and its advantages will be readily understood in the light of the detailed description and the examples of embodiment which follow.

I. Measurements and Tests Used

The rubber compositions are characterized, before and after curing, as indicated below.

I-1. Mooney Plasticity

An oscillating consistometer such as described in French Standard NF T 43-005 (November 1980) is used. The Mooney plasticity is measured in accordance with the following principle: the raw composition (i.e. before curing) is moulded in a cylindrical enclosure heated to 100° C. After one minute's preheating, the rotor turns within the test piece at 2 rpm, and the torque used for maintaining this movement is measured after four minutes' rotation. The Mooney plasticity (ML 1+4) is expressed in "Mooney units" (MU, with 1 MU=0.83 Newton·meter).

I-2. Scorching Time

The measurements are effected at 130° C., in accordance with French Standard NF T 43-005. The evolution of the consistometric index as a function of time makes it possible to determine the scorching time for the rubber compositions, assessed in accordance with the above standard by the parameter T5 (case of a large rotor), expressed in minutes, and defined as being the time necessary to obtain an increase in the consistometric index (expressed in MU) of 5 units above the minimum value measured for this index.

I-3. Shore A Hardness

The Shore A hardness of the compositions after curing is assessed in accordance with ASTM Standard D 2240-86.

I-4. Tensile Tests

These tensile tests make it possible to determine the elasticity stresses and the properties at break. Unless indicated otherwise, they are effected in accordance with French Standard NF T 46-002 of September 1988. The nominal secant moduli (or apparent stresses, in MPa) at 10% elongation (M10), 100% elongation (M100) and 300% elongation (M300) are measured in a second elongation (i.e. after a cycle of accommodation to the amount of extension provided for the measurement itself).

The breaking stresses (in MPa) and the elongations at break (in %) are also measured. All these tensile measurements are effected under normal conditions of temperature (23±2° C.) and humidity (50±5% relative humidity), in accordance with French Standard NF T 40-101 (December 1979).

I.5 Dynamic Properties

The dynamic properties $\Delta G^*$ and $\tan(\delta)_{max}$ are measured on a viscoanalyser (Metravib VA4000), in accordance with ASTM Standard D 5992-96. The response of a sample of vulcanized composition (cylindrical test piece of a thickness of 4 mm and a section of 400 mm$^2$), subjected to an alternating single sinusoidal shearing stress, at a frequency of 10 Hz, under normal conditions of temperature (23° C.) in accordance with Standard ASTM D 1349-99, or at a different temperature, depending on the case, is recorded. Scanning is effected at an amplitude of deformation of 0.1 to 45% (outward cycle), then of 45% to 0.1% (return cycle). The results used are the complex dynamic shear modulus (G*) and the loss factor tan(δ). For the return cycle, the maximum value of tan(δ) which is observed is indicated, denoted $(\tan(\delta)_{max}$, as is the deviation in the complex modulus ($\Delta G^*$) between the values at 0.1% and 45% deformation (Payne effect).

II. Detailed Description of the Invention

In the present application, composition "practically devoid" of zinc or zinc derivative is to be understood to mean a composition comprising at the very most a negligible quantity of zinc or zinc derivative, that is to say such that the amount by weight of zinc therein is less than 0.5 phr, preferably less than 0.3 phr. More preferably, the composition of the invention is devoid of (i.e. totally devoid of) zinc (or zinc derivative), in other words the amount of zinc therein is equal to zero (0 phr).

The compositions of the invention are therefore based on at least: (i) a (at least one) diene elastomer, (ii) a (at least one) inorganic filler as reinforcing filler, (iii) a (at least one) silane polysulfide of formula (I) as inorganic filler/diene elastomer coupling agent, and (iv) 0 to less than 5 phr of carbon black.

The expression composition "based on" is to be understood in the present application to mean a composition comprising the mixture and/or the product of reaction of the various constituents used, some of these base constituents (for example, the coupling agent and the inorganic filler) being liable to, or intended to, react together, at least in part, during the different phases of manufacturing of the compositions, in particular during the vulcanization (curing) thereof.

In the present description, unless expressly indicated otherwise, all the percentages (%) indicated are mass %.

II-1. Diene Elastomer

Elastomer or rubber (the two terms being synonymous) of "diene" type is generally understood to mean an elastomer resulting at least in part (i.e. a homopolymer or a copolymer) from diene monomers (monomers bearing two double carbon-carbon bonds, whether conjugated or not).

The diene elastomers, in known manner, may be classed in two categories: those referred to as "essentially unsaturated" and those referred to as "essentially saturated". "Essentially unsaturated" diene elastomer is understood to mean a diene elastomer resulting at least in part from conjugated diene monomers, having a content of members or units of diene origin (conjugated dienes) which is greater than 15% (mole %); thus, for example, diene elastomers such as butyl rubbers or copolymers of dienes and of alpha-olefins of the EPDM type do not fall within this definition, and may on the contrary be described as "essentially saturated" diene elastomers (low or very low content of units of diene origin which is always less than 15%). Within the category of "essentially unsaturated" diene elastomers, "highly unsaturated" diene elastomer is understood to mean in particular a diene elastomer having a content of units of diene origin (conjugated dienes) which is greater than 50%.

These definitions being given, the following are understood more particularly to be meant by diene elastomer capable of being used in the compositions according to the invention:

(a)—any homopolymer obtained by polymerisation of a conjugated diene monomer having 4 to 12 carbon atoms;

(b)—any copolymer obtained by copolymerisation of one or more dienes conjugated together or with one or more vinyl aromatic compounds having 8 to 20 carbon atoms;

(c)—a ternary copolymer obtained by copolymerisation of ethylene, of an α-olefin having 3 to 6 carbon atoms with a non-conjugated diene monomer having 6 to 12 carbon atoms, such as, for example, the elastomers obtained from ethylene, from propylene with a non-conjugated diene monomer of the aforementioned type, such as in particular 1,4-hexadiene, ethylidene norbornene or dicyclopentadiene;

(d)—a copolymer of isobutene and isoprene (butyl rubber), and also the halogenated, in particular chlorinated or brominated, versions of this type of copolymer.

Although it applies to any type of diene elastomer, the person skilled in the art of tires will understand that the present invention is preferably used with essentially unsaturated diene elastomers, in particular those of type (a) or (b) above.

Suitable conjugated dienes are, in particular, 1,3-butadiene, 2-methyl-1,3-butadiene, 2,3-di(C1-C5 alkyl)-1,3-butadienes such as, for example, 2,3-dimethyl-1,3-butadiene, 2,3-diethyl-1,3-butadiene, 2-methyl-3-ethyl-1,3-butadiene, 2-methyl-3-isopropyl-1,3-butadiene, an aryl-1,3-butadiene, 1,3-pentadiene and 2,4-hexadiene. Suitable vinyl aromatic compounds are, for example, styrene, ortho-, meta- and para-methylstyrene, the commercial mixture "vinyltoluene", para-tert. butylstyrene, methoxystyrenes, chlorostyrenes, vinylmesitylene, divinylbenzene and vinylnaphthalene.

The copolymers may contain between 99% and 20% by weight of diene units and between 1% and 80% by weight of vinyl aromatic units. The elastomers may have any microstructure, which is a function of the polymerisation conditions used, in particular of the presence or absence of a modifying and/or randomising agent and the quantities of modifying and/or randomising agent used. The elastomers may for example be block, random, sequential or microsequential elastomers, and may be prepared in dispersion or in solution; they may be coupled and/or starred or alternatively functionalised with a coupling and/or starring or functionalising agent.

Preferred are polybutadienes, and in particular those having a content of 1,2-units of between 4% and 80%, or those having a content of cis-1,4 greater than 80%, polyisoprenes, butadiene/styrene copolymers, and in particular those having a styrene content of between 5% and 50% by weight and more particularly between 20% and 40%, a content of 1,2-bonds of the butadiene fraction of between 4% and 65%, a content of trans-1,4 bonds of between 20% and 80%, butadiene/isoprene copolymers and in particular those having an isoprene content of between 5% and 90% by weight and a glass transition temperature ("Tg"—measured in accordance with ASTM D3418-82) of −40° C. to −80° C., isoprene/styrene copolymers and in particular those having a styrene content of between 5% and 50% by weight and a Tg of between −25° C. and −50° C. In the case of butadiene/styrene/isoprene copolymers, those which are suitable are in particular those having a styrene content of between 5% and 50% by weight and more particularly between 10% and 40%, an isoprene content of between 15% and 60% by weight, and more particularly between 20% and 50%, a butadiene content of between 5% and 50% by weight and more particularly between 20% and 40%, a content of 1,2-units of the butadiene fraction of between 4% and 85%, a content of trans-1,4 units of the butadiene fraction of between 6% and 80%, a content of 1,2-plus 3,4-units of the isoprene fraction of between 5% and 70%, and a content of trans-1,4 units of the isoprene fraction of between 10% and 50%, and more generally any butadiene/styrene/isoprene copolymer having a Tg of between −20° C. and −70° C.

In summary, particularly preferably, the diene elastomer of the composition according to the invention is selected from the group of (highly unsaturated) diene elastomers which consists of polybutadienes (BR), synthetic polyisoprenes (IR), natural rubber (NR), butadiene copolymers, isoprene copolymers and mixtures of these elastomers. Such copolymers are more preferably selected from the group consisting of butadiene/styrene copolymers (SBR), isoprene/butadiene copolymers (BIR), isoprene/styrene copolymers (SIR), isoprene/butadiene/styrene copolymers (SBIR) and mixtures of such copolymers.

The composition according to the invention is in particular intended, preferably, for a tread for a passenger-vehicle tire. In such a case, the diene elastomer is preferably an SBR copolymer, in particular an SBR prepared in solution, preferably used in a mixture with a polybutadiene; more preferably, the SBR has a content of styrene of between 20% and 30% by weight, a content of vinyl bonds of the butadiene fraction of between 15% and 65%, a content of trans-1,4 bonds of between 15% and 75% and a Tg of between −20° C. and −55° C., and the polybutadiene has more than 90% cis-1,4 bonds.

In the case of a tire for a heavy vehicle, the diene elastomer is preferably an isoprene elastomer, that is to say an isoprene homopolymer or copolymer, in other words a diene elastomer selected from the group consisting of natural rubber (NR), synthetic polyisoprenes (IR), the various isoprene copolymers or a mixture of these elastomers. Of the isoprene copolymers, mention will be made in particular of isobutene/isoprene copolymers (butyl rubber—IIR), isoprene/styrene copolymers (SIR), isoprene/butadiene copolymers (BIR) or isoprene/butadiene/styrene copolymers (SBIR). This isoprene elastomer is preferably natural rubber or a synthetic cis-1,4 polyisoprene; of these synthetic polyisoprenes, preferably polyisoprenes having a content (mole %) of cis-1,4 bonds greater than 90%, more preferably still greater than 98%, are used. For such a tire for a heavy vehicle, the diene elastomer may also be constituted, in its entirety or in part, of another highly unsaturated elastomer such as, for example, an SBR elastomer.

The compositions of the treads of the invention may contain a single diene elastomer or a mixture of several diene elastomers, the diene elastomer(s) possibly being used in association with any type of synthetic elastomer other than a diene one, or even with polymers other than elastomers, for example thermoplastic polymers.

II-2. Reinforcing Inorganic Filler

"Reinforcing inorganic filler" is to be understood here, in known manner, to mean any inorganic or mineral filler, whatever its colour and its origin (natural or synthetic), also referred to as "white" filler, "clear" filler or alternatively "non-black" filler, in contrast to carbon black, this inorganic filler being capable, on its own, without any other means than an intermediate coupling agent, of reinforcing a rubber composition intended for the manufacture of a tire tread, in other words which is capable of replacing a conventional tire-grade carbon black, in particular for treads, in its reinforcement function; such a filler is generally characterized, in known manner, by the presence of hydroxyl (—OH) groups at its surface.

Preferably, the reinforcing inorganic filler is a filler of the siliceous or aluminous type, or a mixture of these two types of fillers.

The silica ($SiO_2$) used may be any reinforcing silica known to the person skilled in the art, in particular any precipitated or fumed silica having a BET surface area and a CTAB specific surface area both of which are less than 450 m²/g, preferably from 30 to 400 m²/g. Highly dispersible precipitated silicas (referred to as "HDS") are preferred, in particular when the invention is used for the manufacture of tires having a low rolling resistance; as examples of such silicas, mention may be made of the silicas Ultrasil 7000 from Degussa, the silicas Zeosil 1165 MP, 1135 MP and 1115 MP from Rhodia, the silica Hi-Sil EZ150G from PPG, the silicas Zeopol 8715, 8745 or 8755 from Huber, and silicas of high specific surface area such as described in application WO 03/016387.

The reinforcing alumina ($Al_2O_3$) preferably used is a highly dispersible alumina having a BET surface area of from 30 to 400 m²/g, more preferably between 60 and 250 m²/g, and an average particle size at most equal to 500 nm, more preferably at most equal to 200 nm. Non-limitative examples of such reinforcing aluminas are in particular the aluminas "Baikalox A125" or "CR125" (from Baïkowski), "APA-100RDX" (Condea), "Aluminoxid C" (Degussa) or "AKP-G015" (Sumitomo Chemicals).

By way of other examples of inorganic filler capable of being used in the rubber compositions of the invention, mention may also be made of aluminium (oxide-)hydroxides, aluminosilicates, titanium oxides, silicon carbides or nitrides, all of the reinforcing type such as described in documents WO 99/28376 (or U.S. Pat. No. 6,610,261), WO 00/73372 (or U.S. Pat. No. 6,747,087), WO 02/053634 (or US 2004-0030017), WO 2004/003067 and WO 2004/056915.

When the treads of the invention are intended for tires of low rolling resistance, the reinforcing inorganic filler used, in particular if it is silica, preferably has a BET surface area of between 60 and 350 m²/g. One advantageous embodiment of the invention consists of using a reinforcing inorganic filler, in particular a silica, having a large BET specific surface area, within a range from 130 to 300 m²/g, owing to the recognised high reinforcing ability of such fillers. According to another preferred embodiment of the invention, a reinforcing inorganic filler, in particular a silica, having a BET specific surface area of less than 130 m²/g, and preferably in such a case of between 60 and 130 m²/g may be used (see for example applications WO 03/002648 or US 2005-0016651, and WO 03/002649 or US 2005-0016650 which furthermore teach using reduced quantities of zinc, of between 0.5 and 1.5 phr, in combination with silicas of low specific surface area).

The physical state in which the reinforcing inorganic filler is present is immaterial, whether it be in the form of a powder, microbeads, granules, balls or any other appropriate densified form. Of course, "reinforcing inorganic filler" is also understood to mean mixtures of different reinforcing inorganic fillers, in particular of highly dispersible siliceous and/or aluminous fillers such as described above.

The person skilled in the art will be able to adapt the amount of reinforcing inorganic filler according to the nature of the inorganic filler used and the type of tire in question, for example a motorcycle tire, passenger-vehicle tire or alternatively a tire for utility vehicles such as vans or heavy vehicles. Preferably, this amount of reinforcing inorganic filler will be selected to be between 20 and 200 phr, more preferably between 30 and 150 phr. More preferably still, in particular when the composition of the invention is intended for a tire tread, the amount of reinforcing inorganic filler is selected to be greater than 50 phr, for example between 60 and 140 phr, in particular within a range from 70 to 130 phr.

In the present specification, the BET specific surface area is determined in known manner by adsorption of gas using the method of Brunauer-Emmett-Teller described in "*The Journal of the American Chemical Society*" Vol. 60, page 309, February 1938, more precisely in accordance with French Standard NF ISO 9277 of December 1996 [multipoint volumetric method (5 points)—gas: nitrogen—degassing: 1 hour at 160° C.—range of relative pressure p/po: 0.05 to 0.17]. The CTAB specific surface area is the external surface area determined in accordance with French Standard NF T 45-007 of November 1987 (method B).

Finally, the person skilled in the art will understand that a reinforcing filler of a different nature, in particular organic, could be used as filler equivalent to the reinforcing inorganic filler described in the present section, when this reinforcing filler would be covered with an inorganic layer such as silica, or alternatively would comprise on its surface functional sites, in particular hydroxyl sites, necessitating the use of a coupling agent to establish the bond between the filler and the elastomer.

II-3. Coupling Agent

It will be recalled here that "coupling agent" is understood to mean, in known manner, an agent capable of establishing a sufficient chemical and/or physical bond between the inorganic filler and the diene elastomer; such a coupling agent, which is at least bifunctional, has, for example, the simplified general formula "Y-A-X", in which:

Y represents a functional group ("Y" function) which is capable of bonding physically and/or chemically with the inorganic filler, such a bond being able to be established, for example, between a silicon atom of the coupling agent and the surface hydroxyl (OH) groups of the inorganic filler (for example, surface silanols in the case of silica);

X represents a functional group ("X" function) which is capable of bonding physically and/or chemically with the diene elastomer, for example by means of a sulfur atom;

A represents a divalent group making it possible to link Y and X.

Coupling agents, in particular silica/diene elastomer coupling agents, have been described in a very large number of documents, the best known being bifunctional organosilanes bearing alkoxyl functions (that is to say, by definition, "alkoxysilanes") as "Y" functions and, as "X" functions, functions capable of reacting with the diene elastomer, such as, for example, polysulfide functions.

Of the known alkoxysilane polysulfide compounds, particular mention should be made of bis(3-triethoxysilylpropyl) tetrasulfide (abbreviated to "TESPT"), of the formula $[(C_2H_5O)_3Si(CH_2)_3S_2]_2$, sold in particular by Degussa under the name Si69 (or X50S when it is supported to 50% by weight on carbon black), in the form of a commercial mixture of polysulfides $S_x$ with an average value of x which is close to 4.

TESPT, which has been known for a very long time, is still considered today as the product providing the best compromise in terms of resistance to scorching, hysteresis and reinforcing ability, for rubber compositions reinforced with a reinforcing inorganic filler such as silica. It is therefore the coupling agent of reference for the person skilled in the art for tires filled with silica of low rolling resistance, sometimes referred to as "Green Tires" because of the energy saving offered (or "energy-saving Green Tires").

This TESPT coupling agent is not suitable for the compositions of the invention which are devoid of or practically devoid of zinc, the invention having revealed that the latter require in particular the use of a specific silane polysulfide of the aforementioned formula (I).

Such a compound of formula (I) is known and has been described in particular in the application WO 2004/033548 (or US 2004-0129360) as coupling agent in rubber compositions filled with an inorganic filler such as silica, intended for crown reinforcement armatures (or "belts") of tires.

It can clearly be seen that to provide the bond between the diene elastomer and the reinforcing inorganic filler, it comprises per molecule:

firstly, as "X" function, a polysulfide functional group (Se) capable of forming a stable bond with the diene elastomer;

secondly, as "Y" function, one and only one ($—OR^3$) group per silicon atom—($\equiv$Si—$OR^3$) function—enabling it to be grafted on to the reinforcing inorganic filler by means of the surface hydroxyl groups of the latter;

the two linkages Z providing the bond between the polysulfide group at the centre of the molecule and the two ($\equiv$Si—$OR^3$) functions fixed to each end of the molecule.

The groups Z comprising from 1 to 18 carbon atoms represent in particular an alkylene chain, a saturated cycloalkylene group, an arylene group or a divalent group formed of a combination of at least two of these groups. They are preferably selected from among $C_1$-$C_{18}$ alkylenes and $C_6$-$C_{12}$ arylenes; they may be substituted or interrupted by one or more heteroatoms, selected in particular from among S, O and N.

In formula (I) above, preferably the following characteristics are satisfied:

the symbols $R^1$ and $R^2$ are selected from among methyl, ethyl, n-propyl and isopropyl;

the symbol $R^3$ is selected from among hydrogen, methyl, ethyl, n-propyl and isopropyl;

the symbols Z are selected from among $C_1$-$C_8$—alkylenes.

More preferably still, the symbols $R^1$ and $R^2$ are selected from among methyl and ethyl;

the symbol $R^3$ is selected from among hydrogen, methyl and ethyl;

the symbols Z are selected from among $C_1$-$C_4$ alkylenes, in particular methylene, ethylene or propylene, more particularly propylene —$(CH_2)_3$—.

By way of a preferred example of polysulfide of formula (I), mention will be very particularly made of the monohydroxysilane polysulfide of specific formula (II) hereafter:

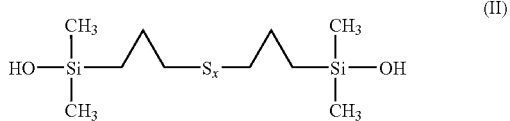

(II)

Such a silane has for example been described, as has its synthesis, in the patent applications WO 02/30939 (or U.S. Pat. No. 6,774,255) and WO 02/31041 (or US 2004-0051210), and also in the aforementioned application WO 2004/033548 (or US 2004-0129360).

As other examples of silane polysulfide of formula (I), mention may also be made of bis-monoalkoxydimethylsilylpropyl polysulfides and mixtures of these polysulfides, in particular those of specific formulae (III), (IV) or (V) hereafter:

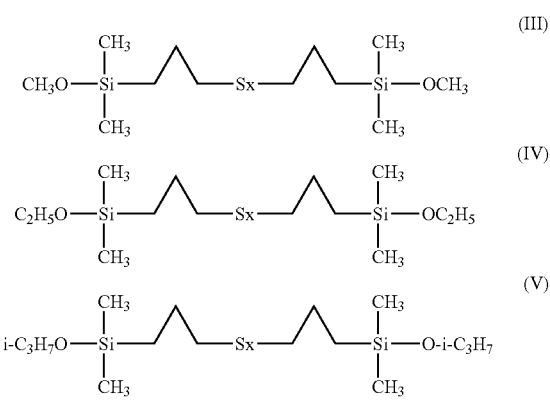

In formulae (I) to (V) above, in the case in which the synthesis method of the silane polysulfide in question can give rise to only one sort of polysulfide, the number x is then an integer, preferably within a range from 2 to 8.

The polysulfides are preferably selected from among disulfides (x=2), trisulfides (x=3), tetrasulfides (x=4), pentasulfides (x=5), hexasulfides (x=6) and mixtures of these polysulfides, more particularly from among disulfides, trisulfides and tetrasulfides.

More preferably, the disulfides, trisulfides, tetrasulfides of bis-monohydroxydimethylsilylpropyl (or bis-propyldimethylsilanol) (formula II) or of bis-monoethoxydimethylsilylpropyl (formula IV), and mixtures of these polysulfides are selected in particular.

The person skilled in the art will readily understand that, when the synthesis method gives rise to a mixture of polysulfide groups each having a different number of sulfur atoms (typically $S_2$ to $S_8$), then this number x is generally a fractional number, the average value of which may vary according to the synthesis method adopted and the specific conditions of this synthesis. In such a case, the synthesised polysulfide is in fact formed of a distribution of polysulfides centred on an average value (in moles) of the "x"s preferably of from 2 to 8, more preferably from 2 to 6, even more preferably within a range from 2 to 4.

According to a particularly preferred embodiment, monohydroxydimethylsilylpropyl tetrasulfide ($S_4$) of general formula (II), having the specific structural formula (VI), is used:

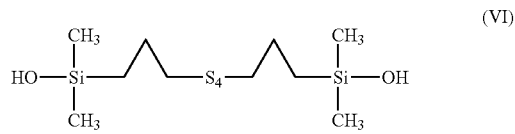

(VI)

According to another particularly preferred embodiment, the monohydroxydimethylsilylpropyl disulfide ($S_2$) of general formula (II), having the specific structural formula (VII) can be used:

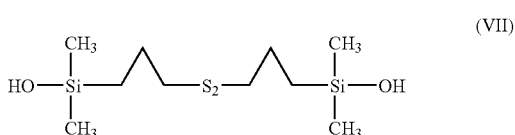

(VII)

According to another particular embodiment, the monoethoxydimethylsilylpropyl tetrasulfide ($S_4$) (abbreviated to "MESPT") of general formula (IV) above, the monoethoxylated homologue of the aforementioned TESPT, of specific structural formula (VIII) (Et=ethyl) can be used:

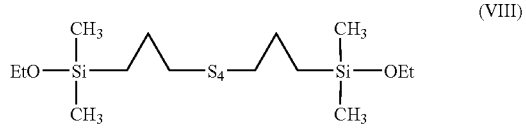

According to another particular embodiment, the monoethoxydimethylsilylpropyl disulfide ($S_2$) (abbreviated to "MESPD") of general formula (IV), having the specific structural formula (IX) can be used:

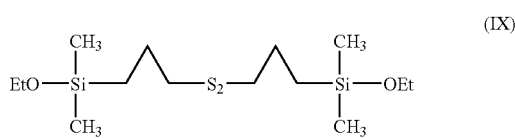

The silane polysulfide compounds of the above formulae (I) to (IX) are well-known and described in the prior art, for example in applications EP-A-680 997 (or U.S. Pat. No. 5,650,457), EP-A-1 043 357 (or CA-A-2 303 559), FR-A-2 823 215 (or WO 02/83782), or the aforementioned applications WO 02/30939, WO 02/31041 and WO 2004/033548.

The person skilled in the art will be able to adjust the content of polysulfide of formula (I) as a function of the specific embodiments of the invention, in particular of the quantity of reinforcing inorganic filler used, the preferred amount representing between 2% and 20% by weight relative to the quantity of reinforcing inorganic filler; amounts less than 15%, in particular less than 10%, are more particularly preferred.

Taking into account the quantities expressed above, generally the content of silane polysulfide is preferably between 2 and 15 phr. Below the minimum amount indicated, the effect risks being inadequate, whereas beyond the maximum amount advocated generally no further improvement is observed, while the costs of the composition increase; for these various reasons, this content is more preferably still between 2 and 12 phr.

II-4. Carbon Black

The rubber composition of the invention has the other essential characteristic of comprising less than 5, preferably less than 4, phr of carbon black, more preferably less than 3 phr of carbon black (in particular between 0.05 and 3 phr); it may be totally devoid of (i.e. zero phr) carbon black.

Suitable carbon blacks are all the carbon blacks capable of providing a black coloration to the rubber compositions, in particular the blacks of the type HAF, ISAF and SAF, which are known to the person skilled in the art and conventionally used in tires. Of the latter, mention may be made of the reinforcing carbon blacks of the series (ASTM grades) 100, 200 or 300 used in the treads of these tires (for example N115, N134, N234, N326, N330, N339, N347, N375), but also those of the non-reinforcing type (because they are less structured) of the higher series 400 to 700 (for example the blacks N660, N683, N772). Non-reinforcing blacks referred to as "ink blacks" could also be used by way of example.

The carbon blacks may be used in isolation, as available commercially, or in any other form, for example as supports for some of the rubber-making additives used.

II-5. Various Additives

The rubber compositions according to the invention may also comprise all or some of the conventional additives usually used in elastomer compositions intended for the manufacture of tires, in particular treads, such as, for example, plasticisers or extender oils, whether the latter be aromatic or non-aromatic in nature, pigments, protective agents such as anti-ozone waxes, chemical antiozonants, antioxidants, antifatigue agents, reinforcing resins, methylene acceptors (for example novolac phenolic resin) or donors (for example HMT or H3M) such as described for example in application WO 02/10269 (or US 2003-0212185), a cross-linking system based either on sulfur or on sulfur and/or peroxide and/or bismaleimide donors, vulcanization accelerators, vulcanization activators, with the exclusion, of course, of zinc-based activators.

Preferably, these compositions comprise, as preferred non-aromatic or only very slightly aromatic plasticising agent, at least one compound selected from the group consisting of naphthenic oils, paraffinic oils, MES oils, TDAE oils, glycerol esters (in particular trioleates), hydrocarbon plasticising resins having a high Tg preferably greater than 30° C., and mixtures of such compounds. The overall amount of such a preferred plasticising agent is preferably between 15 and 45 phr, more preferably between 20 and 40 phr.

Of these hydrocarbon plasticising resins (it will be recalled that the designation "resin" is reserved by definition for a solid compound), mention will be made in particular of the resins of homopolymers or copolymers of alpha-pinene, beta-pinene, dipentene or polylimonene, C5 fraction, for example of C5 fraction/styrene copolymer, which are usable alone or in combination with plasticising oils such as MES or TDAE oils.

To the reinforcing filler previously described (i.e. reinforcing inorganic filler plus carbon black, if applicable) there may also be added, depending on the intended application, inert fillers (non-reinforcing) such as particles of clay, bentonite, talc, chalk, kaolin, usable for example in coloured sidewalls or tire treads.

These compositions may also contain, in addition to the coupling agents, coupling activators, agents (comprising for example the single Y function) for covering the reinforcing inorganic filler or more generally processing aids liable, in known manner, owing to an improvement in the dispersion of the inorganic filler in the rubber matrix and to a reduction in the viscosity of the compositions, to improve their ability to be worked in the uncured state, these agents being, for example, hydrolysable silanes such as alkylalkoxysilanes (in particular alkyltriethoxysilanes), polyols, polyethers (for example polyethylene glycols), primary, secondary or tertiary amines (for example trialkanolamines), hydroxylated or hydrolysable POS, for example α,ω-dihydroxypolyorganosiloxanes (in particular α,ω-dihydroxypolydimethylsiloxanes), and fatty acids such as, for example, stearic acid.

II-6. Manufacture of the Rubber Compositions

The subject of the invention is also a process for preparing a rubber composition based on a diene elastomer and a reinforcing inorganic filler, devoid of or practically devoid of zinc (i.e. comprising less than 0.5 phr of zinc) and having improved processability in the uncured state, this process being characterized in that at least one inorganic filler as reinforcing filler, a silane polysulfide of the above formula (I) and from 0 to less than 5 phr, preferably from 0 to less than 4 phr, of carbon black are incorporated by kneading in at least one diene elastomer.

The rubber compositions of the invention are manufactured in suitable mixers, using two successive preparation phases in accordance with a general procedure well-known to the person skilled in the art: a first phase of thermomechanical working or kneading (sometimes referred to as "non-productive" phase) at high temperature, up to a maximum temperature of between 130° C. and 200° C., preferably between 145° C. and 185° C., followed by a second phase of mechanical working (sometimes referred to as "productive" phase) at lower temperature, typically less than 120° C., for example between 60° C. and 100° C., during which finishing phase the cross-linking or vulcanization system is incorporated.

According to a preferred embodiment of the invention, all the base constituents of the compositions of the invention, with the exception of the vulcanization system, namely the reinforcing inorganic filler, the coupling agent of formula (I) and the carbon black, are incorporated intimately by kneading in the diene elastomer during the first, so-called non-productive, phase, that is to say that at least these different base constituents are introduced into the mixer and are kneaded thermomechanically, in one or more stages, until the maximum temperature of between 130° C. and 200° C., preferably between 145° C. and 185° C., is reached.

By way of example, the first (non-productive) phase is effected in a single thermomechanical step during which all the necessary constituents, any additional covering agents or processing agents and various other additives, with the exception of the vulcanization system, are introduced into a suitable mixer, such as a conventional internal mixer. The total duration of the kneading, in this non-productive phase, is preferably between 1 and 15 minutes. After cooling the mixture thus obtained during the first, non-productive, phase, the vulcanization system is then incorporated at low temperature, generally in an external mixer such as an open mill; the entire composition is then mixed (productive phase) for several minutes, for example between 2 and 15 minutes.

The vulcanization system proper is preferably based on sulfur and an accelerator. Any compound capable of acting as a vulcanization accelerator for the diene elastomers in the presence of sulfur may be used, in particular those selected from the group consisting of 2-mercaptobenzothiazyl disulfide (abbreviated to "MBTS"), N-cyclohexyl-2-benzothiazyl sulfenamide (abbreviated to "CBS"), N,N-dicyclohexyl-2-benzothiazyl sulfenamide (abbreviated to "DCBS"), N-tert. butyl-2-benzothiazyl sulfenamide (abbreviated to "TBBS"), N-tert. butyl-2-benzothiazyl sulfenimide (abbreviated to "TBSI") and mixtures of these compounds. Preferably a primary accelerator of sulfenamide type is used.

To this vulcanization system there may be added, incorporated during the first, non-productive, phase and/or during the productive phase, various known secondary accelerators or vulcanization activators, with the exclusion of zinc and any zinc derivative such as ZnO, such as for example fatty acids such as stearic acid, guanidine derivatives (in particular diphenylguanidine), etc. The amount of sulfur is preferably between 0.5 and 3.0 phr, and the amount of the primary accelerator is preferably between 0.5 and 5.0 phr.

The final composition thus obtained is then calendered, for example in the form of a film or a sheet, in particular for characterization in the laboratory, or alternatively extruded in the form of a rubber profiled element usable for example as a tire tread for a passenger vehicle.

The vulcanization (or curing) is carried out in known manner at a temperature generally between 130° C. and 200° C., for a sufficient time which may vary, for example, between 5 and 90 minutes, depending, in particular, on the curing temperature, the vulcanization system adopted and the vulcanization kinetics of the composition in question.

In summary, the process according to the invention for preparing a rubber composition based on a diene elastomer and a reinforcing inorganic filler, devoid of or practically devoid of zinc (i.e. comprising less than 0.5 phr of zinc) and having improved processability, comprises the following preferred characteristic steps:
incorporating in a diene elastomer, in a mixer:
a reinforcing inorganic filler;
a silane polysulfide as coupling agent;
optionally carbon black, by thermomechanically kneading the entire mixture, in one or more stages, until a maximum temperature of between 130° C. and 200° C. is reached;
cooling the entire mixture to a temperature of less than 100° C.;
then incorporating:
a vulcanization system devoid of zinc or such that the amount of zinc in the final composition is less than 0.5 phr;
kneading the entire mixture until a maximum temperature of less than 120° C. is reached;
extruding or calendering the rubber composition thus obtained,
and it is characterized in that the amount of optional carbon black is less than 5 phr and in that the silane polysulfide satisfies the aforementioned formula (I).

In this process according to the invention, preferably at least one, more preferably all, of the following characteristics is/are satisfied:
the amount of zinc in the composition is less than 0.3 phr;
the quantity of reinforcing inorganic filler is between 20 and 200 phr, more preferably between 30 and 150 phr;
the quantity of coupling agent is between 2 and 15 phr;
the maximum thermomechanical kneading temperature is between 145° C. and 185° C.;
the reinforcing inorganic filler is a siliceous or aluminous filler;
the quantity of carbon black is less than 4 phr, preferably less than 3 phr;
the diene elastomer is a butadiene/styrene copolymer (SBR), preferably used in a mixture with a polybutadiene (BR).

More preferably, in this process, at least one, even more preferably all, of the following characteristics is/are satisfied:
the amount of zinc in the composition is zero (i.e. 0 phr);
the quantity of inorganic filler is greater than 50 phr, in particular between 60 and 140 phr, for example within a range from 70 to 130 phr;
the quantity of coupling agent is of between 2 and 12 phr, in particular between 3 and 8 phr;
the reinforcing inorganic filler is silica;
the quantity of carbon black is between 0.05 and 3 phr, more preferably between 0.1 and 2 phr;
the silane polysulfide is a polysulfide, in particular disulfide or tetrasulfide, of bis-hydroxysilylpropyl or of bis-($C_1$-$C_4$)alkoxysilylpropyl;
the SBR is an SBR prepared in solution and the BR has more than 90% cis-1,4 bonds.

III. Examples of Embodiment of the Invention

III-1. Preparation of the Compositions

For the following tests, the procedure is as follows: the filler (silica and optional carbon black), the coupling agent, the diene elastomer, and the various other ingredients, with the exception of the vulcanization system, are introduced in succession into an internal mixer filled to 70% of capacity, the initial tank temperature of which is approximately 60° C. Thermomechanical working (non-productive phase) is then performed in one stage, of a duration of about 3 to 4 minutes in total, until a maximum "dropping" temperature of 165° C. is obtained. The mixture thus obtained is recovered, it is cooled and then the vulcanization system (sulfur and sulfenamide-type primary accelerator) is incorporated on an external mixer (homo-finisher) at 30° C., by mixing everything (productive phase) for a suitable time (for example between 5 and 12 min.).

The compositions thus obtained are then calendered either in the form of plates (thickness of 2 to 3 mm) or of thin sheets of rubber in order to measure their physical or mechanical properties, or extruded in the form of treads.

In the following tests, according to one particularly preferred embodiment, carbon black is used in an amount of between 0.1 and 2 phr.

III-2. Tests

A) Test 1

In this first test, five compositions usable for the manufacture of treads of radial-carcass tires for automobiles of passenger-car type, based on known SBR and BR diene elastomers and reinforced with silica, are compared.

These five compositions are identical, with the exception of the nature of the coupling agent, the presence or absence of zinc oxide and the quantity of carbon black used, as indicated below:

composition C-1: TESPT silane; 1.5 phr of ZnO; 5 phr of carbon black;
composition C-2: TESPT silane; without ZnO; 5 phr of carbon black;
composition C-3: TESPT silane; without ZnO; 1 phr of carbon black;
composition C-4: monofunctional silane; without ZnO; 5 phr of carbon black;
composition C-5: monofunctional silane; without ZnO; 1 phr of carbon black.

Composition C-1 constitutes the reference, that used in what are called "Green" tires of low energy consumption; it uses in conventional manner zinc oxide as vulcanization activator (approximately 1.2 phr of metal Zn corresponds to 1.5 phr of ZnO derivative), carbon black in a conventional amount of 5 phr and the TESPT silane as coupling agent, of structural formula (Et=ethyl):

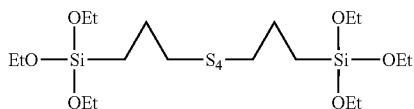

The composition C-5 is the only one which is in accordance with the invention since it is devoid (totally) of zinc (or zinc derivative), incorporating less than 5 phr of carbon black and a monofunctional silane of formula (I). More precisely, this monofunctional silane is the preferred silane of formula (VI) indicated previously:

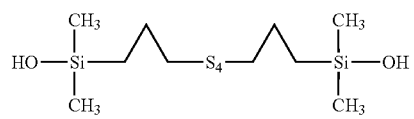

It was prepared in known manner, as indicated in the aforementioned applications WO 02/30939 and WO 02/31041, then introduced at an amount of surface coverage of the silica which is substantially equivalent compared with the TESPT control. In other words, the two coupling agents are used here in a substantially isomolar amount of silicon, that is to say that, whatever the composition, the same number of moles of Y functions (here Y=Si(OEt)$_3$) or Y=Si(OH)(CH$_3$)$_2$ depending on the case) which are reactive with respect to the silica and its surface hydroxyl groups, are used.

Tables 1 and 2 show in succession the formulation of the different compositions (Table 1-amount of the different products expressed in phr), and their properties before and after curing at 165° C. for 15 minutes (Table 2).

On reading Table 2, it will be noted first of all that the properties after curing are substantially identical from one composition to the other in terms of Shore hardness, tensile moduli and ratios of moduli M300/M100, properties at break, with furthermore improved hysteresis properties for composition C-5, which has the lowest values of tan($\delta$)$_{max}$ and particularly of $\Delta G^*$, all clear indicators which attest to an excellent potential of the composition of the invention C-5 in a tire tread, in particular in terms of rolling resistance.

However, it is the properties before curing which incontestably demonstrate the entire advantage of the invention:

first of all, it will be noted that the elimination of ZnO from composition C-2 results in a very significant drop (50%) in the scorching time relative to the reference composition C-1, T5 passing from 12 min. to 6 min.; such a reduction is considered by the person skilled in the art as being crippling from the industrial point of view;

simply reducing the amount of carbon black from 5 phr to 1 phr has no significant effect on the parameter T5 (compare composition C-3 with composition C-2);

nor, furthermore, does replacing the conventional TESPT coupling agent with the monofunctional silane (compare composition C-4 with composition C-2);

unexpectedly, only composition C-5 according to the invention, comprising in combination the monofunctional silane and the very small amount of carbon black, makes it possible to obtain, in the absence of ZnO, a resistance to scorching which is acceptable from the industrial point of view (T5>10 min.), equivalent to that of the starting control composition C-1.

B) Test 2

In this second test, five other compositions based on known SBR and BR diene elastomers and reinforced by silica are compared.

These five compositions are identical, with the exception of the nature of the coupling agent, the presence or absence of zinc oxide and the quantity of carbon black used, as indicated below:

composition C-6: TESPT silane; 1.5 phr of ZnO; 5 phr of carbon black;
composition C-7: TESPT silane; without ZnO; 5 phr of carbon black;
composition C-8: TESPT silane; without ZnO; 3 phr of carbon black;
composition C-9: monofunctional silane; without ZnO; 3 phr of carbon black;
composition C-10: monofunctional silane; without ZnO; 0.3 phr of carbon black.

Composition C-6 constitutes the reference ("Green" tires), using in conventional manner zinc oxide as vulcanization activator (1.2 phr of Zn corresponds to 1.5 phr of ZnO), carbon black in a conventional amount of 5 phr and the TESPT silane as coupling agent.

Only compositions C-9 and C-10 are in accordance with the invention since they are devoid (totally) of zinc (or zinc derivative) and incorporate less than 5 phr of carbon black and a monofunctional silane of formula (I). More precisely, this monofunctional silane is the preferred silane of formula (VIII) indicated previously (Et=ethyl):

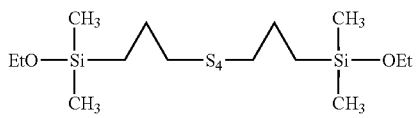

It was prepared in known manner, as indicated in the aforementioned application WO 02/83782, then introduced at an amount of surface coverage of the silica which is substantially equivalent compared with the TESPT control. In other words, the two coupling agents are used here in a substantially isomolar amount of silicon, that is to say that, whatever the composition, the same number of moles of Y functions (here Y=Si(OEt)$_3$ or Y=Si(OEt)(CH$_3$)$_2$ depending on the case) which are reactive with respect to the silica and its surface hydroxyl groups, are used.

Tables 3 and 4 show in succession the formulation of the different compositions (Table 3-amount of the different products expressed in phr), and their properties before and after curing at 165° C. for 15 minutes (Table 3).

On reading Table 4, it will be noted first of all that the properties after curing are similar from one composition to the other in terms of Shore hardness, tensile moduli and ratios of moduli M300/M100, properties at break, with furthermore improved hysteresis properties for compositions C-9 and C-10, which have the lowest values of $\tan(\delta)_{max}$ and particularly of $\Delta G^*$, all indicators which attest to an excellent potential of these two compositions in a tire tread, in particular in terms of rolling resistance.

But it is the properties before curing which once again demonstrate and confirm the advantage of the invention:
  first of all, it will be noted that the elimination of ZnO from composition C-7 results in a crippling drop of 50% in the scorching time relative to the reference composition C-6, T5 passing from 14 min. to 7 min.;
  simply reducing the amount of carbon black from 5 phr to 3 phr has no significant effect on the parameter T5 (compare composition C-8 with composition C-7);
  unexpectedly, only the compositions C-9 and C-10 according to the invention, comprising in combination the monofunctional silane and the very small amount of carbon black (3 and 0.3 phr, respectively) make it possible to obtain, in the absence of ZnO, a resistance to scorching which is acceptable from the industrial point of view (T5>10 min.), equivalent to that of the starting control composition C-6, or even improved in the case of the very small amount (0.3 phr) of carbon black of composition C-10.

In summary, the comparative tests above clearly demonstrate that simply replacing the TESPT with a monofunctional silane of formula (I), or simply reducing the amount of carbon black to a very low level, does not constitute a satisfactory solution for overcoming the problems of processing (reduction in scorching time) due to the elimination of the zinc or zinc oxide from the vulcanization system.

Only the use of the coupling agent of formula (I), in combination with a very small amount of carbon black (0 to less than 5 phr), makes it possible to eliminate totally the zinc or any zinc derivative from the rubber compositions without replacing it with another metal, and while retaining the processability in the uncured state of the latter.

The invention can be applied particularly advantageously to rubber compositions intended for the manufacture of treads for tires, in particular when these treads are intended for tires for passenger vehicles, motorcycles or industrial vehicles of the heavy-vehicle type.

TABLE 1

| | Composition No.: | | | | |
|---|---|---|---|---|---|
| | C-1 | C-2 | C-3 | C-4 | C-5 |
| SBR (1) | 69 | 69 | 69 | 69 | 69 |
| BR (2) | 31 | 31 | 31 | 31 | 31 |
| silica (3) | 81 | 81 | 81 | 81 | 81 |
| silane (4) | 6.5 | 6.5 | 6.5 | — | — |
| silane (5) | — | — | — | 4.3 | 4.3 |
| plasticiser (6) | 16 | 16 | 16 | 16 | 16 |
| plasticiser (7) | 12 | 12 | 12 | 12 | 12 |
| anti-ozone wax | 1.5 | 1.5 | 1.5 | 1.5 | 1.5 |
| antioxidant (8) | 1.9 | 1.9 | 1.9 | 1.9 | 1.9 |
| DPG (9) | 1.5 | 1.5 | 1.5 | 1.5 | 1.5 |
| carbon black (10) | 5 | 5 | 1 | 5 | 1 |
| ZnO | 1.5 | 0 | 0 | 0 | 0 |
| stearic acid | 2 | 2 | 2 | 2 | 2 |
| sulfur | 1.1 | 1.1 | 1.1 | 1.1 | 1.1 |
| accelerator (11) | 2 | 2 | 2 | 2 | 2 |

(1) SBR (expressed as dry SBR) extended with 10% by weight (6.9 phr) of MES oil (or a total of 75.9 phr of extended SBR); 25% styrene, 58% 1,2-polybutadiene units and 23% trans-1,4-polybutadiene units (Tg = −24° C.);
(2) BR with 4.3% of 1-2; 2.7% of trans; 93% of cis 1-4 (Tg = −106° C.);
(3) silica type "HDS" ("Zeosil 1165MP" from Rhodia - BET and CTAB: approximately 160 m$^2$/g);
(4) TESPT coupling agent ("Si69" from Degussa);
(5) monofunctional silane of formula (VI);
(6) MES oil (Flexon 683, from Exxon Mobil);
(7) plasticising hydrocarbon resin of high Tg (73° C.) (polylimonene resin "Dercolyte L120" - from DRT);
(8) N-1,3-dimethylbutyl-N-phenylparaphenylenediamine (Santoflex 6-PPD from Flexsys);
(9) diphenylguanidine (Perkacit DPG from Flexsys);
(10) carbon black N234;
(11) N-cyclohexyl-2-benzothiazyl sulfenamide (Santocure CBS-from Flexsys).

TABLE 2

| | Composition No.: | | | | |
|---|---|---|---|---|---|
| | C-1 | C-2 | C-3 | C-4 | C-5 |
| Properties before curing: | | | | | |
| Mooney (MU) | 92 | 99 | 94 | 101 | 94 |
| Scorching time T5 (min) | 12 | 6 | 7 | 8 | 11 |
| Properties after curing: | | | | | |
| Shore A hardness | 68 | 67 | 66 | 67 | 66 |
| M100 (MPa) | 1.96 | 1.99 | 1.92 | 1.87 | 1.81 |
| M300 (MPa) | 2.34 | 2.56 | 2.50 | 2.24 | 2.12 |
| M300/M100 | 1.2 | 1.3 | 1.3 | 1.2 | 1.2 |
| Breaking stress (MPa) | 21.7 | 20.4 | 21.4 | 21.5 | 20.4 |
| Elongation at break (%) | 496 | 454 | 469 | 566 | 538 |
| $\tan(\delta)_{max}$ | 0.33 | 0.33 | 0.32 | 0.32 | 0.30 |
| $\Delta G^*$ | 5.3 | 4.3 | 3.9 | 4.0 | 3.3 |

TABLE 3

| | Composition No.: | | | | |
|---|---|---|---|---|---|
| | C-6 | C-7 | C-8 | C-9 | C-10 |
| SBR (1) | 70 | 70 | 70 | 70 | 70 |
| BR (2) | 30 | 30 | 30 | 30 | 30 |
| silica (3) | 80 | 80 | 80 | 80 | 80 |
| silane (4) | 6.5 | 6.5 | 6.5 | — | — |
| silane (5) | — | — | — | 5.0 | 5.0 |
| plasticiser (6) | 16 | 16 | 16 | 16 | 16 |
| plasticiser (7) | 12 | 12 | 12 | 12 | 12 |
| anti-ozone wax | 1.5 | 1.5 | 1.5 | 1.5 | 1.5 |

TABLE 3-continued

| | Composition No.: | | | | |
|---|---|---|---|---|---|
| | C-6 | C-7 | C-8 | C-9 | C-10 |
| antioxidant (8) | 1.9 | 1.9 | 1.9 | 1.9 | 1.9 |
| DPG (9) | 1.5 | 1.5 | 1.5 | 1.5 | 1.5 |
| carbon black (10) | 5 | 5 | 3 | 3 | 0.3 |
| ZnO | 1.5 | 0 | 0 | 0 | 0 |
| stearic acid | 2 | 2 | 2 | 2 | 2 |
| sulfur | 1.1 | 1.1 | 1.1 | 1.1 | 1.1 |
| accelerator (11) | 2 | 2 | 2 | 2 | 2 |

(1) SBR (expressed as dry SBR) extended with 10% by weight (6.9 phr) of MES oil (or a total of 75.9 phr of extended SBR); 25% styrene, 58% 1,2-polybutadiene units and 23% trans-1,4-polybutadiene units (Tg = −24° C.);
(2) BR with 4.3% of 1-2; 2.7% of trans; 93% of cis 1-4 (Tg = −106° C.);
(3) silica type "HDS" ("Zeosil 1165MP" from Rhodia - BET and CTAB: approximately 160 m²/g);
(4) TESPT coupling agent ("Si69" from Degussa);
(5) monofunctional silane of formula (VIII);
(6) MES oil (Flexon 683, from Exxon Mobile);
(7) plasticising hydrocarbon resin of high Tg (73° C.) (polylimonene resin "Dercolyte L120" - from DRT);
(8) N-1,3-dimethylbutyl-N-phenylparaphenylenediamine (Santoflex 6-PPD from Flexsys);
(9) diphenylguanidine (Perkacit DPG from Flexsys);
(10) carbon black N234;
(11) N-cyclohexyl-2-benzothiazyl sulfenamide (Santocure CBS from Flexsys).

TABLE 4

| | Composition No.: | | | | |
|---|---|---|---|---|---|
| | C-6 | C-7 | C-8 | C-9 | C-10 |
| Properties before curing: | | | | | |
| Mooney (MU) | 106 | 114 | 111 | 108 | 100 |
| Scorching time T5 (min) | 14 | 7 | 8 | 13 | 18 |
| Properties after curing: | | | | | |
| Shore A hardness | 67 | 68 | 68 | 66 | 65 |
| M100 (MPa) | 1.9 | 2.2 | 2.2 | 1.9 | 1.9 |
| M300 (MPa) | 2.4 | 2.8 | 2.7 | 2.2 | 2.2 |
| M300/M100 | 1.3 | 1.3 | 1.2 | 1.2 | 1.2 |
| Breaking stress (MPa) | 21.1 | 20.2 | 20.5 | 22.4 | 20.2 |
| Elongation at break (%) | 524 | 438 | 460 | 517 | 515 |
| tan(δ)$_{max}$ | 0.33 | 0.33 | 0.33 | 0.30 | 0.29 |
| ΔG* | 4.4 | 3.8 | 4.1 | 3.0 | 3.1 |

The invention claimed is:

1. A tire comprising a rubber composition devoid of zinc, or containing less than 0.5 phr of zinc, wherein zinc has not been replaced with another metal to provide scorch resistance, and devoid of carbon black, or containing less than 2 phr of carbon black, comprising (phr=parts by weight per hundred parts of elastomer):
a diene elastomer;
a reinforcing inorganic filler;
a silane polysulfide of formula (I):

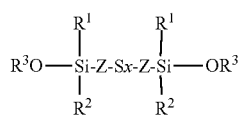

(I)

in which:
the symbols $R^1$ and $R^2$, which may be identical or different, each represent a monovalent hydrocarbon group selected from among alkyls, whether straight chain or branched, having from 1 to 6 carbon atoms and the phenyl radical;
the symbols $R^3$, which may be identical or different, each represent hydrogen or a monovalent hydrocarbon group selected from among alkyls, whether straight chain or branched, having from 1 to 4 carbon atoms and alkoxy-alkyls, whether straight-chain or branched, having from 2 to 8 carbon atoms;
the symbols Z, which may be identical or different, are divalent bond groups comprising from 1 to 18 carbon atoms;
x is an integer or fractional number equal to or greater than 2.

2. The tire according to claim 1, the following characteristics being satisfied:
the symbols $R^1$ and $R^2$ are selected from among methyl, ethyl, n-propyl and isopropyl;
the symbol $R^3$ is selected from among hydrogen, methyl, ethyl, n-propyl and isopropyl;
the symbols Z are selected from among $C_1$-$C_8$ alkylenes.

3. The tire according to claim 2, the following characteristics being satisfied:
the symbols $R^1$ and $R^2$ are selected from among methyl and ethyl;
the symbol $R^3$ is selected from among hydrogen, methyl and ethyl;
the symbols Z are selected from among $C_1$-$C_4$ alkylenes.

4. The tire according to claim 3, Z being propylene.

5. The tire according to claim 1, the silane polysulfide being selected from among bis-monohydroxydimethylsilylpropyl polysulfides and mixtures of these polysulfides.

6. The tire according to claim 1, the silane polysulfide being selected from among bis-monoalkoxydimethylsilylpropyl polysulfides and mixtures of these polysulfides.

7. The tire according to claim 1, the polysulfide being selected from among disulfides (x=2), trisulfides (x=3), tetrasulfides (x=4), pentasulfides (x=5), hexasulfides (x=6) and mixtures of these polysulfides.

8. The tire according to claim 1, the diene elastomer being selected from the group consisting of polybutadienes, synthetic polyisoprenes, natural rubber, butadiene copolymers, isoprene copolymers and mixtures of these elastomers.

9. The tire according to claim 1, the reinforcing inorganic filler being a siliceous or aluminous filler.

10. The tire according to claim 1, the amount of inorganic filler being between 20 and 200 phr.

11. The tire according to claim 10, the amount of inorganic filler being between 30 phr and 150 phr.

12. The tire according to claim 11, the amount of inorganic filler being greater than 50 phr.

13. The tire according to claim 12, the amount of inorganic filler being between 60 phr and 140 phr.

14. The tire according to claim 13, the amount of inorganic filler being between 70 phr and 130 phr.

15. The tire according to claim 1, the amount of silane polysulfide being between 2 and 15 phr.

16. The tire according to claim 14, the amount of silane polysulfide being between 2 and 12 phr.

17. The tire according to claim 1, further containing carbon black, wherein the carbon black is less than 2 phr.

18. The tire according to claim 17, wherein the carbon black is between 0.05 and 1 phr.

19. The tire according to claim 1, characterized in that the amount of zinc therein is less than 0.3 phr.

20. The tire according to claim 19, characterized in that the amount of zinc therein is zero.

21. A process for preparing a tire rubber composition based on a diene elastomer and a reinforcing inorganic filler, devoid of or containing less than 0.5 phr of zinc wherein zinc has not been replaced with another metal to provide scorch resistance, and is devoid of carbon black or containing less than 2 phr of carbon black and having improved processability in the uncured state, comprising: incorporating by kneading in at least one diene elastomer, at least one inorganic filler as reinforcing filler, 0 to less than 2 phr of carbon black and a silane polysulfide of formula (I):

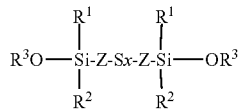

in which:
the symbols $R^1$ and $R^2$, which may be identical or different, each represent a monovalent hydrocarbon group selected from among alkyls, whether straight-chain or branched, having from 1 to 6 carbon atoms and the phenyl radical;
the symbols $R^3$, which may be identical or different, each represent hydrogen or a monovalent hydrocarbon group selected from among alkyls, whether straight-chain or branched, having from 1 to 4 carbon atoms and alkoxyalkyls, whether straight-chain or branched, having from 2 to 8 carbon atoms;
the symbols Z, which may be identical or different, are divalent bond groups comprising from 1 to 18 carbon atoms;
x is an integer or fractional number equal to or greater than 2.

22. The process according to claim 21, comprising the following steps:
incorporating in the diene elastomer, in a mixer:
the reinforcing inorganic filler;
the silane polysulfide of formula (I) as coupling agent;
0 to less than 2 phr of the carbon black;
by thermomechanically kneading the entire mixture, in one or more stages, until a maximum temperature of between 130° C. and 200° C. is reached;
cooling the entire mixture to a temperature of less than 100° C.;
then incorporating:
a vulcanization system devoid of zinc or such that the amount of zinc in the final composition is less than 0.5 phr;
kneading the entire mixture until a maximum temperature of less than 120° C. is reached;
extruding or calendering the rubber composition thus obtained.

23. The process according to claim 21, the following characteristics being satisfied:
the symbols $R^1$ and $R^2$ are selected from among methyl, ethyl, n-propyl and isopropyl;
the symbol $R^3$ is selected from among hydrogen, methyl, ethyl, n-propyl and isopropyl;
the symbols Z are selected from among $C_1$-$C_8$ alkylenes.

24. The process according to claim 23, the following characteristics being satisfied:
the symbols $R^1$ and $R_2$ are selected from among methyl and ethyl;
the symbol $R_3$ is selected from among hydrogen, methyl and ethyl;
the symbols Z are selected from among $C_1$-$C_4$ alkylenes.

25. The process according to claim 24, Z being propylene.

26. The process according to claim 21, the silane polysulfide being selected from among bis-monoalkoxydimethylsilylpropyl polysulfides and mixtures of these polysulfides.

27. The process according to claim 22, the silane polysulfide being selected from among bis-monoalkoxydimethylsilylpropyl polysulfides and mixtures of these polysulfides.

28. The process according to claim 21, the polysulfide being selected from among disulfides (x=2), trisulfides (x=3), tetrasulfides (x=4), pentasulfides (x=5), hexasulfides (x=6) and mixtures of these polysulfides.

29. The process according to claim 21, the diene elastomer being selected from the group consisting of polybutadienes, synthetic polyisoprenes, natural rubber, butadiene copolymers, isoprene copolymers and mixtures of these elastomers.

30. The process according to claim 21, the reinforcing inorganic filler being a siliceous or aluminous filler.

31. The process according to claim 21, the amount of inorganic filler being between 20 and 200 phr.

32. The process according to claim 21, the quantity of coupling agent being between 2 and 15 phr.

33. The process according to claim 21, further containing carbon black, wherein the carbon black is less than 2 phr.

34. The process according to claim 33, wherein the carbon black is less than 2 phr.

35. The process according to claim 34, wherein the carbon black is from 0.05 up to and including 1 phr.

36. The process according to claim 35, wherein the carbon black is from 0.1 up to and including 1 phr.

37. The process according to claim 21, characterized in that the amount of zinc in the composition is less than 0.3 phr.

38. The process according to claim 37, characterized in that the amount of zinc in the composition is equal to zero.

39. The tire according to claim 18, wherein the carbon black is from 0.1 up to and including 1 phr.

40. The process according to claim 22, the following characteristics being satisfied:
the symbols $R^1$ and $R^2$ are selected from among methyl, ethyl, n-propyl and isopropyl;
the symbol $R^3$ is selected from among hydrogen, methyl, ethyl, n-propyl and isopropyl;
the symbols Z are selected from among $C_1$-$C_8$ alkylenes.

41. The process according to claim 40, the following characteristics being satisfied:
the symbols $R^1$ and $R^2$ are selected from among methyl and ethyl;
the symbol $R^3$ is selected from among hydrogen, methyl and ethyl;
the symbols Z are selected from among $C_1$-$C_4$ alkylenes.

42. The process according to claim 41, Z being propylene.

* * * * *